(12) United States Patent
Dickson, Jr. et al.

(10) Patent No.: US 8,881,952 B1
(45) Date of Patent: Nov. 11, 2014

(54) ICE DISPENSING AND METERING SYSTEM AND METHODS

(75) Inventors: Thomas D. Dickson, Jr., Orem, UT (US); Sterling O. Kingdon, Cedar Hills, UT (US); Mark W. McLane, Lehi, UT (US); David J. Throckmorton, Mapleton, UT (US); Kory B. Robins, Draper, UT (US); W. Reid Stout, Lehi, UT (US)

(73) Assignee: K-TEC, Inc., Orem, UT (US)

( * ) Notice: Subject to any disclaimer, the term of this patent is extended or adjusted under 35 U.S.C. 154(b) by 401 days.

(21) Appl. No.: 12/902,050

(22) Filed: Oct. 11, 2010

(51) Int. Cl.
*G01F 11/20* (2006.01)

(52) U.S. Cl.
USPC ........... 222/239; 222/237; 222/333; 222/197; 222/146.6; 222/185.1

(58) Field of Classification Search
CPC ...... G07F 17/0071; F25C 5/002; F25C 5/007; F25C 5/005
USPC .............. 222/146.6, 226, 236, 237, 239, 242, 222/333, 185.1
See application file for complete search history.

(56) References Cited

U.S. PATENT DOCUMENTS

| | | | | |
|---|---|---|---|---|
| 1,929,788 A | * | 10/1933 | Myers et al. | 221/264 |
| 3,101,872 A | * | 8/1963 | Dickinson | 222/197 |
| 3,393,839 A | * | 7/1968 | Weil et al. | 222/239 |
| 4,498,607 A | | 2/1985 | Jaschinski | |
| 4,946,073 A | * | 8/1990 | Brill et al. | 222/129.4 |
| 5,054,654 A | * | 10/1991 | Schroeder et al. | 222/146.6 |
| 5,549,219 A | * | 8/1996 | Lancaster | 222/1 |
| 5,683,011 A | * | 11/1997 | Miliani | 222/56 |
| 6,607,096 B2 | | 8/2003 | Glass et al. | |
| 6,701,974 B2 | * | 3/2004 | Rudesill | 141/18 |
| 6,880,358 B2 | | 4/2005 | Lucas et al. | |
| 7,186,087 B2 | * | 3/2007 | Romanyszyn | 416/183 |
| 7,870,974 B2 | * | 1/2011 | Miller | 222/108 |
| 2010/0314407 A1 | * | 12/2010 | Nevarez et al. | 222/1 |

* cited by examiner

*Primary Examiner* — Paul R Durand
*Assistant Examiner* — Jeremy W Carroll
(74) *Attorney, Agent, or Firm* — Holland & Hart

(57) ABSTRACT

An ice dispensing assembly includes a hopper, a metering disk, a shelf member, and a separating wall. The hopper includes an outlet opening defined in a bottom end of the hopper, and an ice inlet defined in a top end of the hopper. The metering disk is positioned in the hopper and includes a plurality of cavities. The shelf member is arranged to at least partially shield the cavities from a supply of ice held in the hopper. The metering disk is rotatable relative to the hopper between a first position wherein at least one cavity is exposed to the supply of ice to be filled with ice, and a second position wherein the cavity is separated from the supply of ice by the separating wall and ice in the cavity is dispensed through the outlet opening.

22 Claims, 15 Drawing Sheets

ICE DISPENSING AND METERING SYSTEM AND METHODS

TECHNICAL FIELD

The present disclosure relates to ice dispensing devices, and more particularly to ice dispensing devices that provide controlled volume dispensing of ice.

BACKGROUND

The structure and operating principle of ice dispensers are well known in the art. An ice dispenser typically includes an ice storage receptacle, hopper or bin, a dispensing chute having an input end in flow communication with the ice storage bin and an opposite output or exit end, and a mechanically or electrically activated door, such as a solenoid-operated door, for regulating the flow of ice from the dispensing chute. When activated, the door permits the ice to move or flow under the force of gravity from the dispensing chute into a cup or the like positioned under the exit end of the dispensing chute. In one known approach, a signal for activating the solenoid is generated by the movement of a lever arm attached to a dispensing switch. More specifically, the signal is generated by the dispensing switch which is activated by the movement of the lever arm when a cup is placed and held against the lever arm. In another known approach, a user positions the cup beneath the exit end of the dispensing chute with one hand while depressing a dispensing switch with the other to generate the signal.

An auger is often disposed or arranged in the ice storage bin. The auger may be used for mixing the ice cubes periodically to prevent individual ice cubes from freezing together due to defrost cycles. The auger is mainly used to move the ice cubes from the ice storage bin into the dispensing chute for dispensing. In addition, the ice dispenser may also include an ice crusher that crushes the ice cubes as they are being dispensed. The ice crusher uses a series of blades to chop or crush the ice cubes as the ice cubes are passing through the ice crusher.

Ice dispensers are often used in connection with blended drinks that require ice as an ingredient. Some blended drink devices integrate an ice dispenser so that ice is readily available and dispensed as part of creating the drink. One challenge in creating a consistent blended ice drink is ice portion control. In the automated production of blended ice drinks repeatable portion control may be particularly important to ensure consistency in drink quality and volume.

SUMMARY

One aspect of the present disclosure relates to an ice dispensing system that includes a hopper and a metering member. The hopper is configured to retain a supply of ice and has a bottom end with an outlet opening. The metering member is mounted within the hopper and includes a plurality of ice cavities. The metering member is rotatable between a fill position wherein at least one of the ice cavities is exposed to and filled by the supply of ice, and a dispense position wherein the at least one cavity is aligned with the outlet opening to dispense ice from the at least one cavity.

The metering member may be oriented vertically below the supply of ice. The ice dispensing system may further include a shelf positioned in the hopper between a portion of the supply of ice and the ice cavities. The shelf may include at least one projection extending into the supply of ice. The metering member may rotate relative to the shelf. The ice dispensing system may further include an agitator member mounted to the metering member, wherein rotation of the metering member rotates the agitator within the supply of ice to break apart the supply of ice and facilitates the delivery of the ice to the metering member in the fill position.

The ice dispensing system may include a dividing wall positioned in the hopper, wherein when the metering member is in the dispense position, the at least one ice cavity is shielded from the supply of ice by the dividing wall. The ice cavities may be defined in part by the metering member and in part by a surface of the hopper, wherein rotation of the metering member relative to the hopper agitates the ice in the ice cavities.

A further aspect of the present disclosure is directed to an ice dispensing system that includes a cylindrical hopper, a metering disk, a shelf member, and a separating wall. The cylindrical hopper has an outlet opening defined in a bottom end of the hopper and an ice inlet defined in a top end of the hopper. The metering disk is positioned in the hopper and includes a plurality of cavities. A shelf member is positioned in the hopper and arranged to at least partially shield the cavities from a supply of ice held in the hopper. The separating wall is positioned in the hopper. The metering disk is rotatable relative to the hopper between a first position wherein at least one cavity is exposed to the supply of ice to be filled with ice and a second position wherein the at least one cavity is separated from the supply of ice by the separating wall and ice in the at least one cavity is dispensed through the outlet opening.

The ice dispensing system may also include an agitator positioned in the hopper and movable within the supply of ice to break apart the supply of ice. The plurality of cavities may be evenly spaced apart around a circumference of the metering disk. The shelf member and separating wall may be integrally formed as a single piece. The shelf may extend in a direction at least partially radially inward, and the separating wall may extend generally perpendicular to the shelf. The ice generating system may include an ice generating device mounted to the hopper, wherein the ice generating device is configured to deliver the supply of ice into the hopper through the ice inlet. The ice generating device may generate pellet shaped ice.

The ice dispensing system may include a control system that is operable to rotate the metering disk to dispense a selected volume of ice from the hopper depending on a size of the cavities, a duration of rotating the metering disk, and a speed of rotation of the metering disk. The separating wall may define a nonconcentric interior shape in the hopper that increases ice break up and delivery of ice into the at least one cavity.

A further aspect of the present disclosure relates to a method of dispensing ice. The method includes providing an ice dispensing system that includes a hopper having an outlet opening, and a metering member positioned in the hopper and having a plurality of cavities defined therein. The method also includes filling the hopper with a supply of ice, and rotating the metering member to position at least one cavity of the plurality of cavities in a fill position within the hopper wherein the at least one cavity is exposed for filling with ice from the supply of ice, and a dispense position within the hopper wherein the at least one cavity is aligned with the outlet opening to dispense ice from the hopper.

The ice dispensing system may further include a shelf positioned in the hopper, and the method further includes shielding a portion of the supply of ice from the at least one cavity with the shelf when the at least one cavity is in the fill position. The ice dispensing system further includes a dividing wall positioned in the hopper, the method further comprising shielding a portion of the supply of ice from the at least one cavity with the dividing wall when the at least one cavity is in the dispense position.

The ice dispensing system may further include an ice generating device coupled in flow communication with the hopper, and the method further includes delivering the supply of ice into the hopper from the ice generating device. The ice dispensing system may further include an ice agitator positioned in the hopper and connected to the metering disk, and the method further includes breaking up the supply of ice with the agitator when rotating the metering disk relative to the hopper.

The foregoing and other features, utilities and advantages of the invention will become apparent from the following detailed description of the invention with reference to the accompanying drawings.

DETAILED DESCRIPTION

Figure 1:
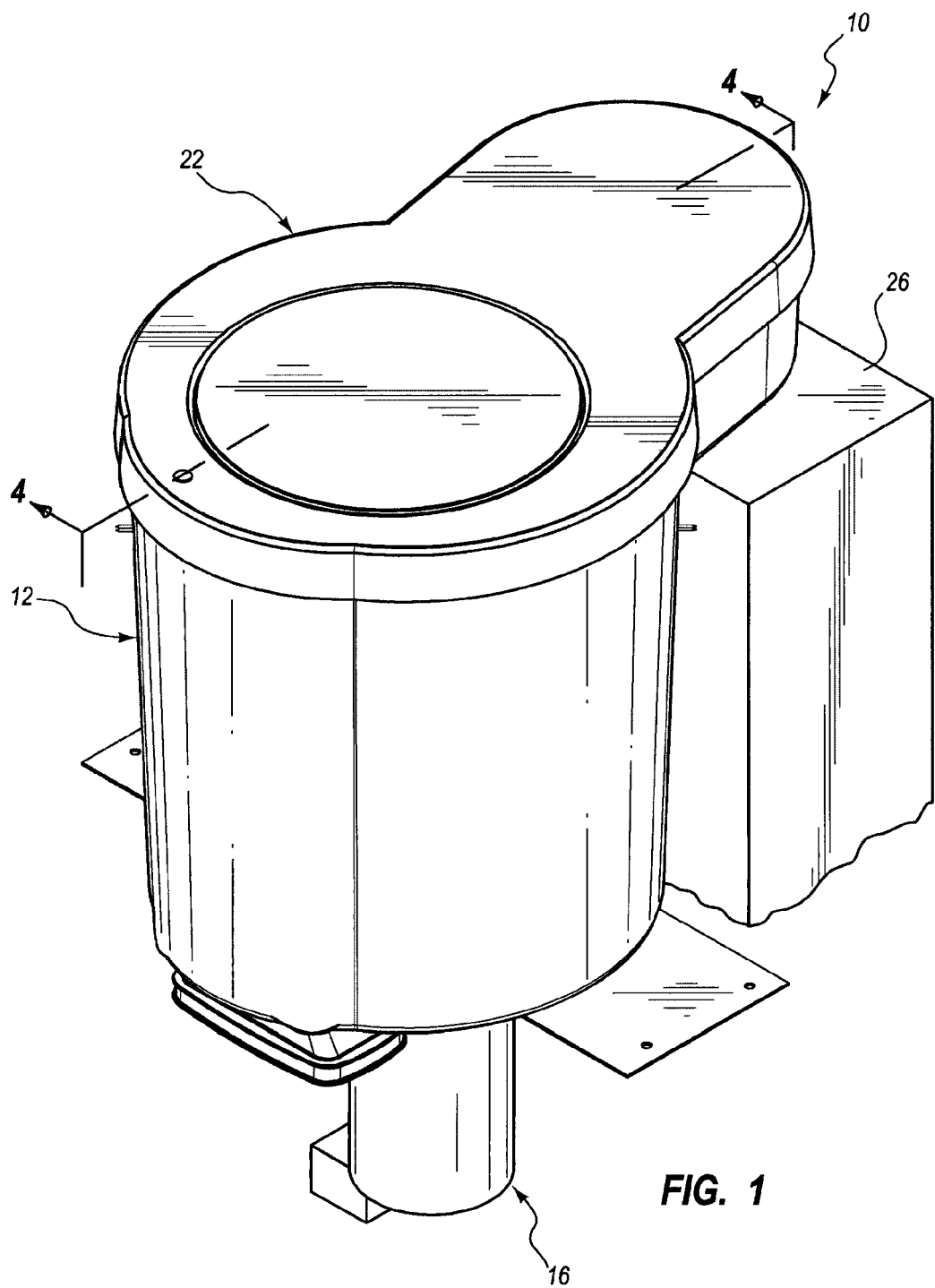
FIG. 1 is a perspective view of an example ice dispensing system in accordance with the present disclosure.

The present disclosure is directed to ice dispensing and ice metering systems. The dispensing and metering features may be integrated into a single device or system. An example ice dispensing and metering system may provide improved portion control in dispensing predetermined amounts of ice. Providing repeatable portion control in an ice dispensing system may be beneficial in applications such as, for example, but without limitation, an automated blended ice drink system. Improved consistency in the amount of ice dispensed in the automated blended ice drink system may provide consistent drink quality and volume.

One aspect of the present disclosure is directed to a metering member for use in an ice dispensing system, wherein the metering member includes a plurality of cavities or pockets that are equal in size and spacing around a perimeter of the metering member. The metering member may be positioned at a bottom of a cylindrical hopper of the ice dispensing system, wherein the hopper may be filled with pieces of ice. The hopper may be divided into a fill region and a dispense region that are separated by a wall or shelf structure. As the metering member rotates within the hopper, the cavities pass through the fill region and are filled with pieces of ice. The filled cavities are then rotated towards the dispense region where the pieces of ice held in the cavities are dispensed from the cavities and out of the ice dispensing system.

Each cavity in the metering member typically has a set volume that is equal for all cavities. The total volume of ice dispensed from the system may be determined based on the volume of the cavities multiplied by the number of cavities that have passed over a dispense opening of the hopper within the dispense region. The total volume of ice dispensed may also be determined at least in part by the rotation angle of the metering member and/or the amount of time the metering member rotates at a certain rotational speed.

In some arrangements, the cavities may have different volumes. A volume and rotated position of each cavity may be tracked by the ice dispensing system, and a total volume of ice may be calculated by determining which of the cavities has passed through the dispense region of the hopper.

The ice dispensing and metering system may include a number of features that assist in consistently filling the cavities with a predetermined volume of ice and dispensing a repeatable portion of ice from the hopper. One such feature is a pressure reducing shelf that is positioned within the hopper at a location vertically above the cavities. The shelf may shield or cover the cavities from the weight of the ice that is positioned above the shelf within the hopper, thereby reducing a head pressure created by the ice. The shelf may be useful in maintaining a consistent amount of ice between the cavities and the shelf to help maintain a relatively constant head pressure of ice when filling the cavities.

Another aspect of the present disclosure is directed to removing ice from within the cavities in the dispense region of the hopper. The ice dispensing and metering system may provide relative movement between walls that define the cavity. Relative movement between the walls of the cavity is provided, in one example, by defining at least one of the walls of the cavity with the metering member and at least a portion of at least one of the walls of the cavity with an internal sidewall of the hopper. As the metering member rotates, the cavity full of ice is dragged along the stationary sidewall of the hopper creating minor agitations in the ice that aid in removal of the ice from the cavity in the dispense region of the hopper.

A still further aspect is directed to agitation of the volume of ice held in the hopper to assist in moving the ice into the cavities of the metering member. In one example, agitation is provided by an agitation bracket or agitator positioned within the hopper. The bracket may be coupled to the metering member and rotate with the metering member, thereby acting as a stirring tine. The bracket may be configured to optimize displacement of ice within the hopper while minimizing crushing of the ice.

Another aspect of the present disclosure relates to additional agitation of the ice using at least one protrusion that extends from the shelf or hopper sidewall into the volume of ice held in the hopper. The agitation protrusions may assist in breaking up the ice prior to the ice coming into contact with the agitation bracket and metering member.

Referring now to FIGS. 1-4, an example ice dispensing and metering system 10 (also referred to herein as an ice dispensing system, an ice dispenser, or an ice metering system) is shown and described. The ice dispensing system 10 includes a hopper 12, a metering member 14, a motor assembly 16, a shelf member 18, an agitator 20, and a lid assembly 22. The metering member 14, shelf member 18, and agitator 20 are positionable within the hopper 12. The lid assembly 22 may substantially cover an open top end of the hopper 12. A drive shaft of the motor assembly 16 may extend into the hopper 12 and operate to rotate the metering member 14 within the hopper 12. Typically, the shelf member 18 maintains a fixed vertical and rotational position within the hopper 12. In some arrangements, the shelf member 18 may twist-lock into a fixed position within the hopper 12 and may be removable for assembly and cleaning.

Referring now to FIGS. 1-10, the hopper 12 includes a top end 30, a bottom end 32, an ice inlet opening 34, an ice input 35, an ice outlet opening 36, and a motor shaft aperture 38. The hopper 12 may further include an interior sidewall surface 40, a locking track 42, an ice chute member 44 defining an opening 46, and a drain member 48. The interior of the hopper 12 may have an inner diameter $D_1$. The diameter $D_1$ may be variable from the top end 30 to the bottom end 32 (e.g., decreasing in diameter toward the bottom end 32) to assist in easier removable of components such as the shelf member 18.

Ice 25 may be delivered into the hopper 12 from an ice generating device 26 (see FIGS. 1 and 10), through the ice input 35 and the ice inlet opening 34 and into an interior 41 of the hopper 12 defined by the interior sidewall surface 40. Ice exits from the hopper 12 through the ice outlet opening 36, and through the ice chute member 44 and its associated opening 46 when dispensed from the ice dispensing system 10. In some arrangements, the ice generating device 26 generates pellet shaped ice 25. The ice generating device 26 may generate ice of other shapes and sizes, such as, for example and without limitation, cube shaped ice, cylindrical shaped ice, ice structures with a hollow center (holed ice), arc shaped ice, and ground or crushed ice.

The drain member 48 may be positioned at the bottom end 32 and constructed to drain liquid from the interior 41. The motor shaft aperture 38 may be constructed to receive a drive shaft of the motor assembly 16 (see FIG. 4).

The hopper 12 may be constructed as a single unitary piece. Alternatively, some features of the hopper 12, such as, for example, the ice chute member 44, locking track 42, and ice input 35 may be constructed as a separate pieces that are attached to the hopper 12 in a secondary assembly step.

Referring now to FIGS. 11-14, the metering member 14 includes a top surface 50, a plurality of cavities 52, a peripheral surface 54, a mounting base 56, a connector recess 58, and an alignment member 60. Each of the cavities 52 may be open along the periphery surface 54. When the metering member 14 is positioned within the hopper 12, the interior sidewall surface 40 of the hopper 12 defines a portion of the cavity 52 along a periphery surface 54. The interior sidewall surface 40 may define a portion of the cavity of the metering member 14, and may define at least in part a shape and size of the cavities of the metering member 14 within which a volume of ice is collected. In some embodiments, the cavities 52 may have different sizes, shapes and spacing on the metering member 14. For example, the cavities 52 may have the increasing sizes with an increasing spacing between cavities 52 around a circumference of the metering member 14.

Each of the cavities 52 may have a contoured portion. The contoured portion may have a radius $R_1$. The contoured shape of the cavities 52 may improve removal of ice from the cavities 52. Many other shapes and sizes are possible for the cavities 52. In one example, the cavities 52 are defined entirely by the metering member 14 and are not defined in any way by the hopper 12. A maximum volume of ice to be held in each cavity 52 of the metering member 14 may be defined by a cross-sectional size of the cavities 52 (e.g., cross-sectional area defined in part by the metering member 14 and the interior sidewall surface 40 of the hopper 12) multiplied by a thickness $T_1$ of the metering member 14 (see FIG. 12).

The mounting base 56 is constructed to support the agitator 20. At least one connector recess 58 may be defined in the mounting base 56. Features of the agitator 20 may contact and be positioned within the connector recess 58 to help support the agitator 20 and maintain the agitator 20 in place relative to the metering member 14. The alignment member 60 may be positioned along and accessible from a bottom surface 51 of the metering member 14. The alignment member 60 may align the metering member 14 relative to the hopper 12. In some arrangements, the alignment member 60 may also provide alignment between the motor assembly 16 and the metering member 14.

In one example, the metering member 14 includes fourteen cavities 52 spaced around the periphery surface 54 of the metering member 14. In other examples, the metering member 14 includes at least one cavity 52, and preferably about six to about thirty cavities 52. Typically, the greater the number of cavities in the metering member 14, the greater the accuracy in dispensing ice from the ice dispensing system 10. However, the smaller the size of the cavities 52, the greater the possibility of inconsistent filling of the cavities with ice, particularly when the ice is clumped together or is of a size that limits the number of pieces of ice that fit within a given cavity. The number of cavities possible for the metering member 14 may also be dependent at least in part on the inner diameter $D_1$ of the hopper 12 and associated maximum possible size (e.g., diameter) of the metering member 14 that may be positioned within the hopper 12. Typically, the greater the inner diameter $D_1$ of the hopper 12 and associated size of the metering member 14, the greater the number of cavities 52 that is possible while still maintaining an adequate size for the cavities 52 for the size of ice pieces being dispensed.

Figure 15:
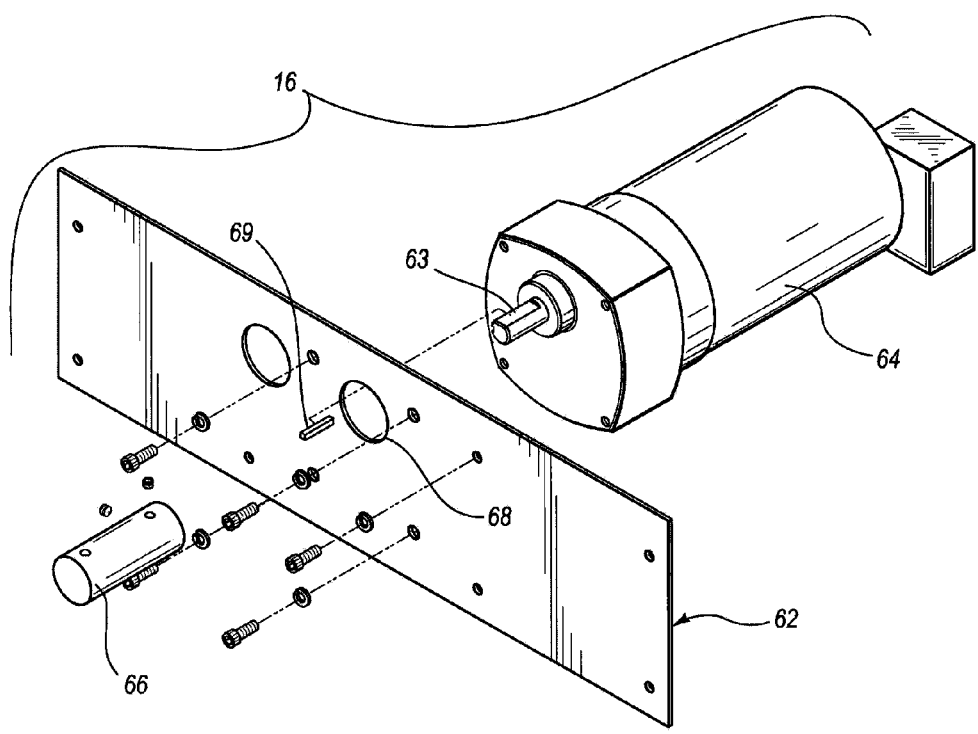
FIG. 15 is an exploded perspective view of a motor assembly of the ice dispensing system of FIG. 1.
Figure 16:
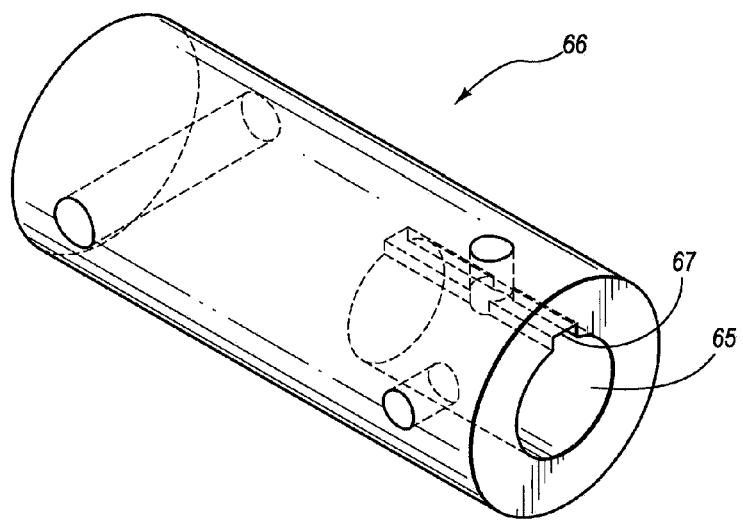
FIG. 16 is a perspective view of a coupler of the motor assembly of FIG. 15.

Referring now to FIGS. 15 and 16, the motor assembly 16 includes a mounting plate 62, a motor 64, and a coupler 66. The mounting plate 62 includes a shaft aperture 68 through which extends a drive shaft 63 of the motor 64. The coupler 66 may be mounted to the drive shaft 63. The coupler 66 may include a bore 65 and a key way 67. The drive shaft 63 extends into the bore 65 and a key 69 may be inserted into the key way 67 to releasably secure the coupler 66 to the drive shaft 63.

The mounting plate 62 may be configured to mount to a support structure such as, for example, a support frame of a self-serve blended drink device or a portion of the hopper 12. In one example, the motor 64 is an AC gear motor rated at 115V at 60 HZ with a 1/10 HP output at 63 RPM. Many different sizes and types of motors 64 may be used depending on a number of variables such as, for example, a volume of ice held by hopper 12.

Figure 17:
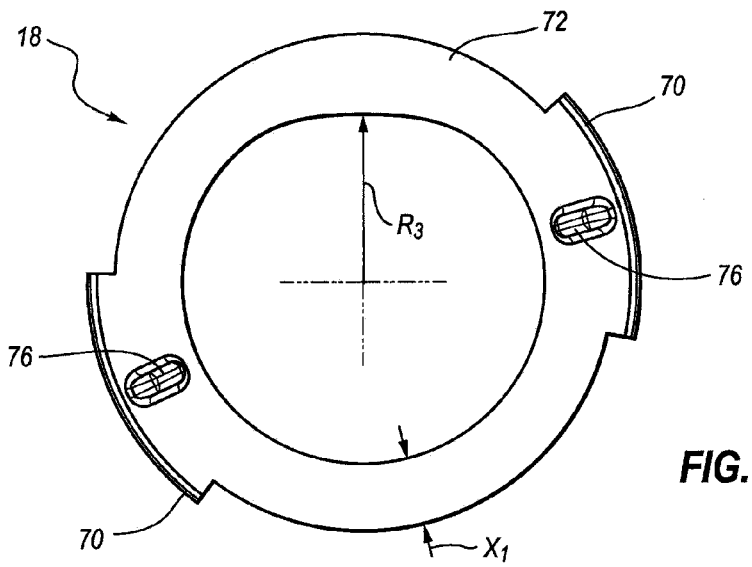
FIG. 17 is a top view of a shelf member of the ice dispensing system of FIG. 1.
Figure 18:
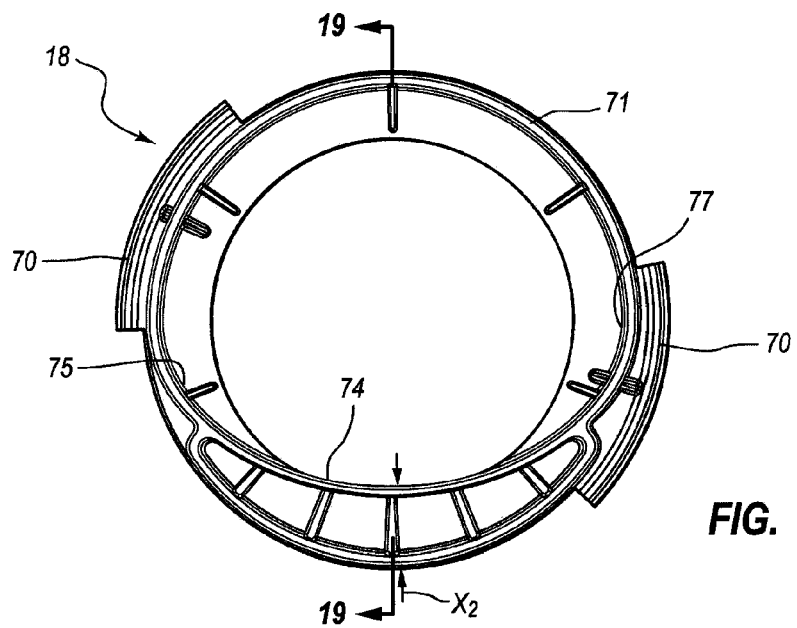
FIG. 18 is a bottom view of the shelf member of FIG. 17.
Figure 19:
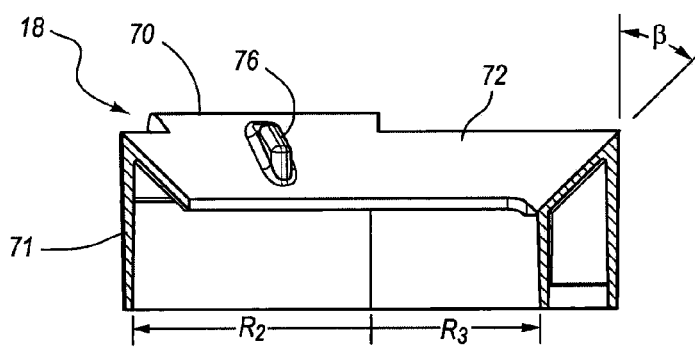
FIG. 19 is a cross-sectional view of the shelf member of FIG. 18 taken along cross-section indicators 19-19.

Referring now to FIGS. 17-19, the shelf member 18 includes at least one lock protrusion 70, a shelf surface 72, a dividing wall 74, and at least one break up protrusion 76. The lock protrusion 70 extends radially outward from a periphery of the shelf member 18. The lock protrusion 70 may extend into and interface with the locking track 42 (see FIG. 7) of the hopper 12. Once positioned within the hopper 12, the shelf member 18 may rotate relative to the hopper 12 to position the lock protrusion 70 within the locking track 42 with a twist lock action. The lock protrusion 70 may engage the locking track 42 with a twist lock action rotating in the same direction as the metering member 14. Typically, the shelf member 18 includes at least one lock protrusion 70 or other feature that releasably secures the shelf member 18 to the hopper 12.

The shelf surface 72 extends radially inward from a periphery 71 of the shelf member 18. The shelf surface 72 may be arranged at an angle $\beta$ relative to a central axis of the shelf member 18 (see FIG. 19). The angle $\beta$ is typically between about 90 degrees and about 30 degrees, and preferably in the range of about 30 degrees to about 60 degrees. The angle $\beta$ of the shelf surface 72 promotes movement of ice held in the hopper 12 toward the metering member 14 and agitator 20.

The shelf surface 72 typically extends radially inward a distance $X_1$ (see FIG. 17) from the periphery 71 of the shelf member 18 (see FIG. 18). The width $X_1$ is typically great enough to overlap or cover the cavities 52 of the metering member 14 in a vertical direction to shield the cavities 52 from ice held in the hopper 12 at a location vertically above the shelf surface 72. The size, shape, and orientation of the shelf surface 72 may reduce and increase consistency of the head pressure applied by the supply of ice within the hopper 12 relative to the cavities 52. Reducing and increase consistency of the head pressure of the ice may provide increased consistency in the amount of ice collected in each of the cavities 52 independent of the amount of ice held within the hopper 12.

The dividing wall 74 extends from a periphery 71 at merge points 75, 77 (see FIG. 18). The dividing wall 74 extends radially inward to a minimum radius $R_3$, which minimum radius is typically smaller than the radius $R_2$ to the portion of the hopper 12 that does not include the dividing wall 74. The smaller radius $R_3$ provides a nonconcentric shape within the interior 41 (see FIG. 4) of the hopper 12. This nonconcentric shape may assist in further agitating the ice to prevent bridging of the ice and providing further break up of large chunks of ice. Additionally, the shape and position of dividing wall 74 within the hopper 12 may help direct the ice into a fill region 28 within the hopper 12 where the cavities 52 are filled with ice.

Figure 4:
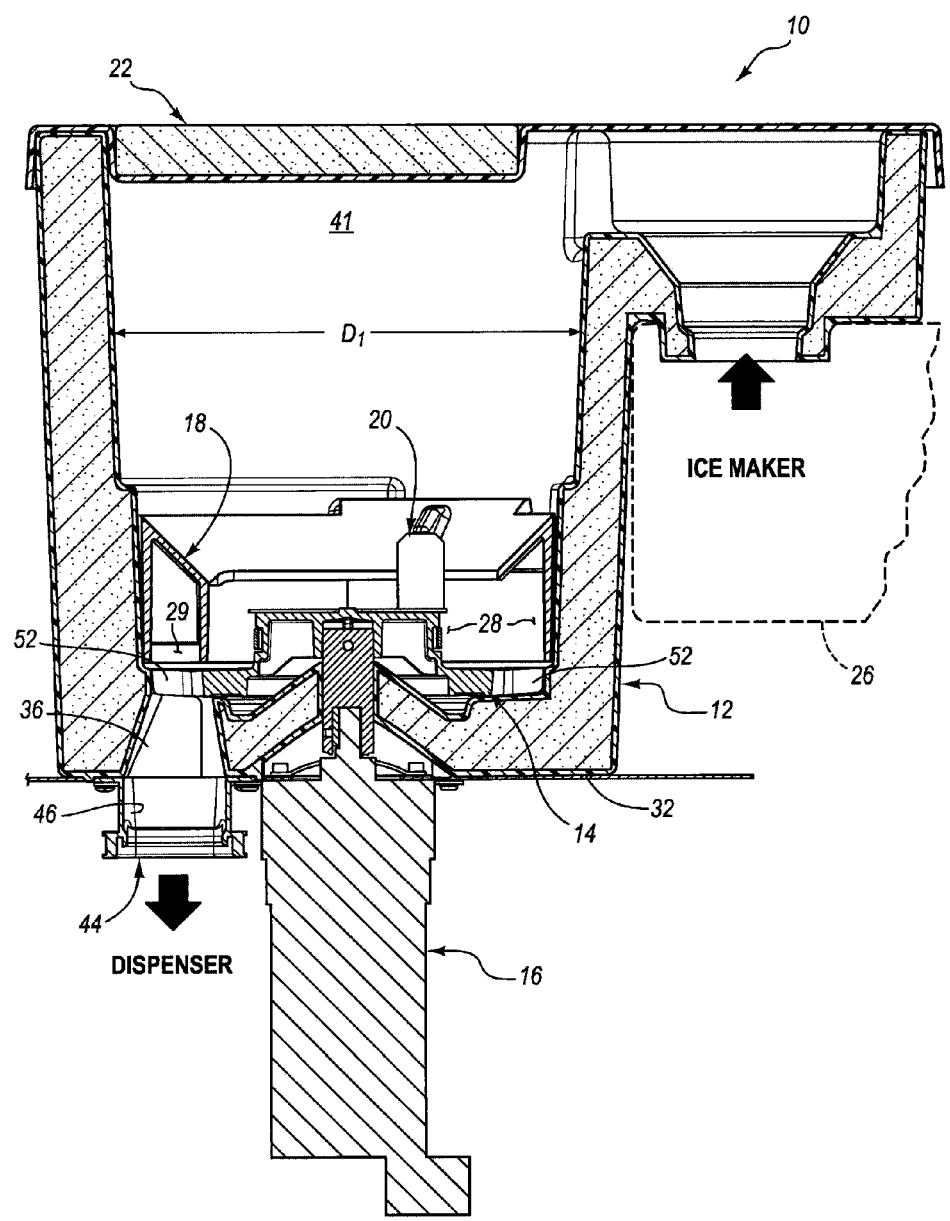
FIG. 4 is a cross-sectional view of the ice dispensing system of FIG. 1 taken along cross-section indicators 4-4.
Figure 5:
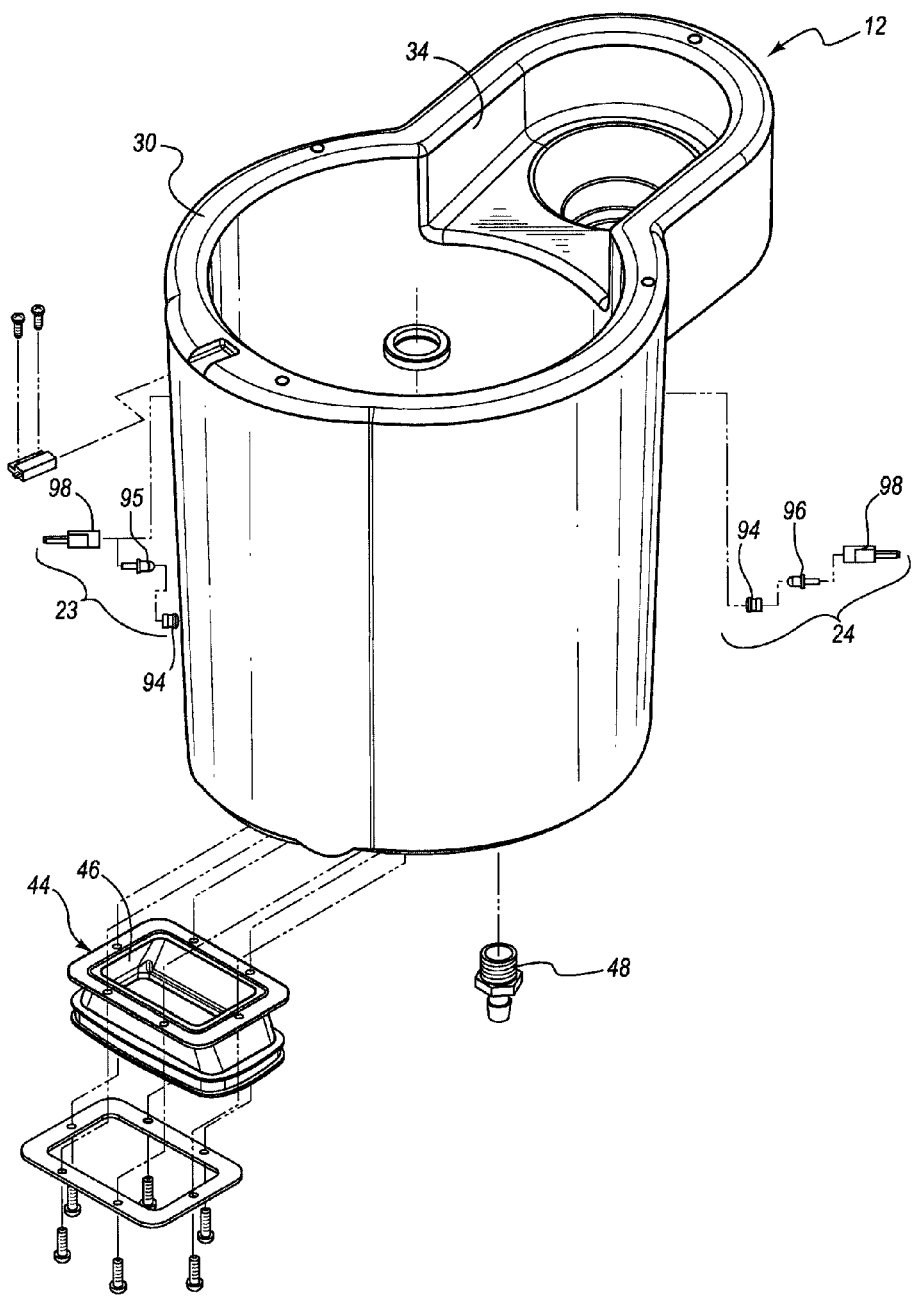
FIG. 5 is an exploded perspective view of a hopper of the ice dispensing system of FIG. 1.
Figure 6:
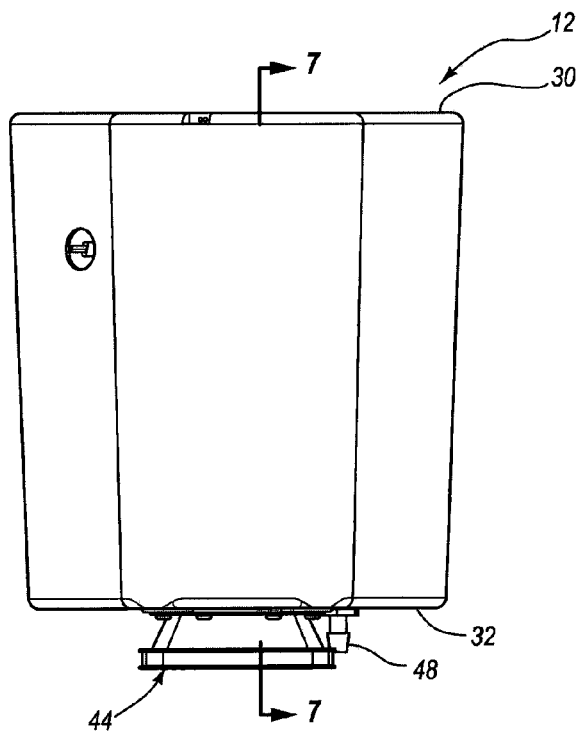
FIG. 6 is a side view of the hopper of FIG. 1.
Figure 7:
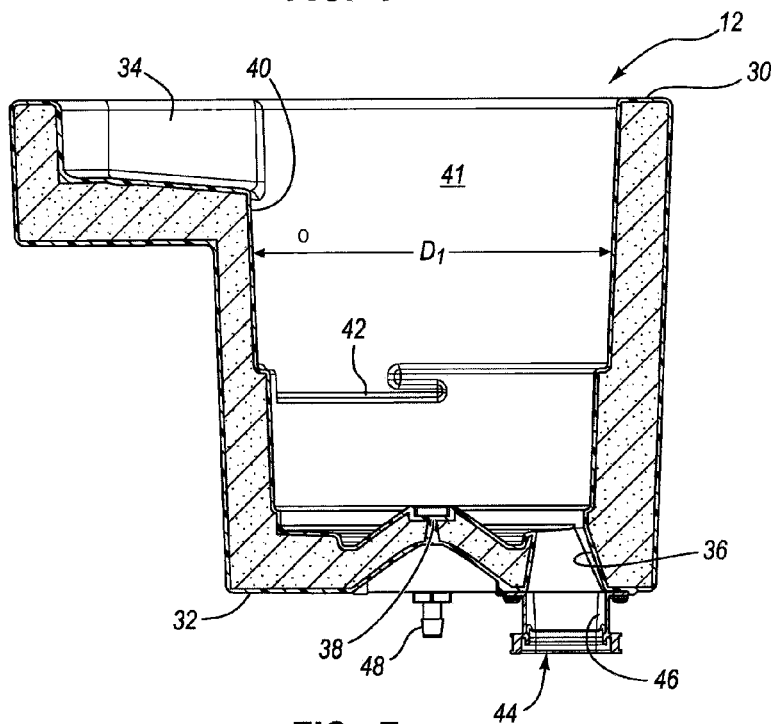
FIG. 7 is a cross-sectional view of the hopper of FIG. 6 taken along cross-section indicators 7-7.
Figure 8:
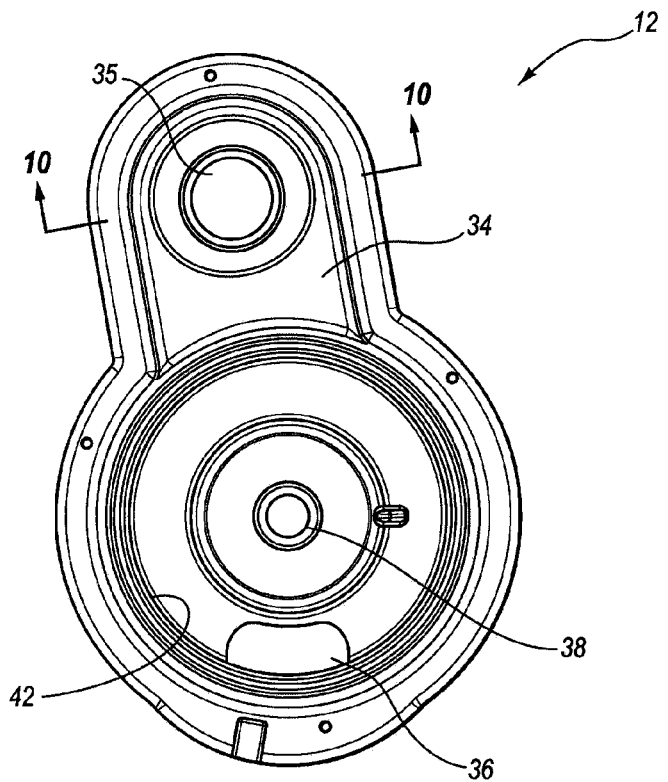
FIG. 8 is a top view of the hopper of FIG. 1.
Figure 9:
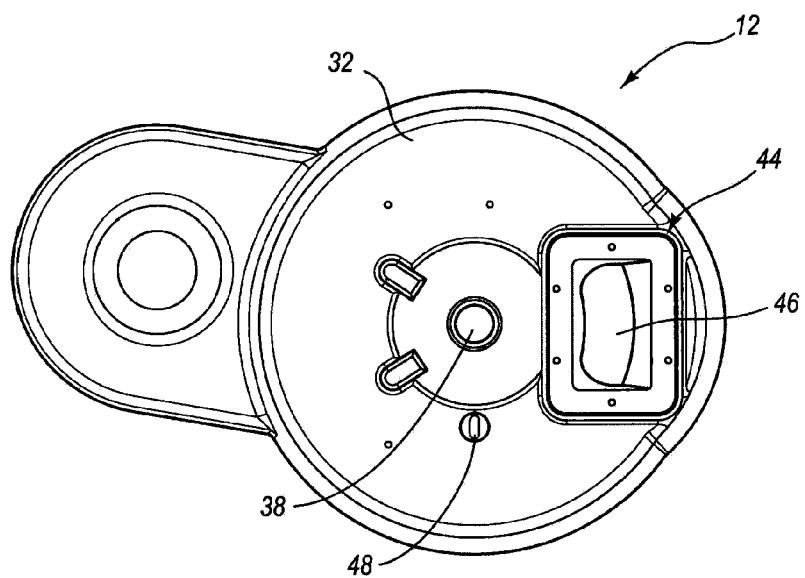
FIG. 9 is a bottom view of the hopper of FIG. 1.
Figure 10:
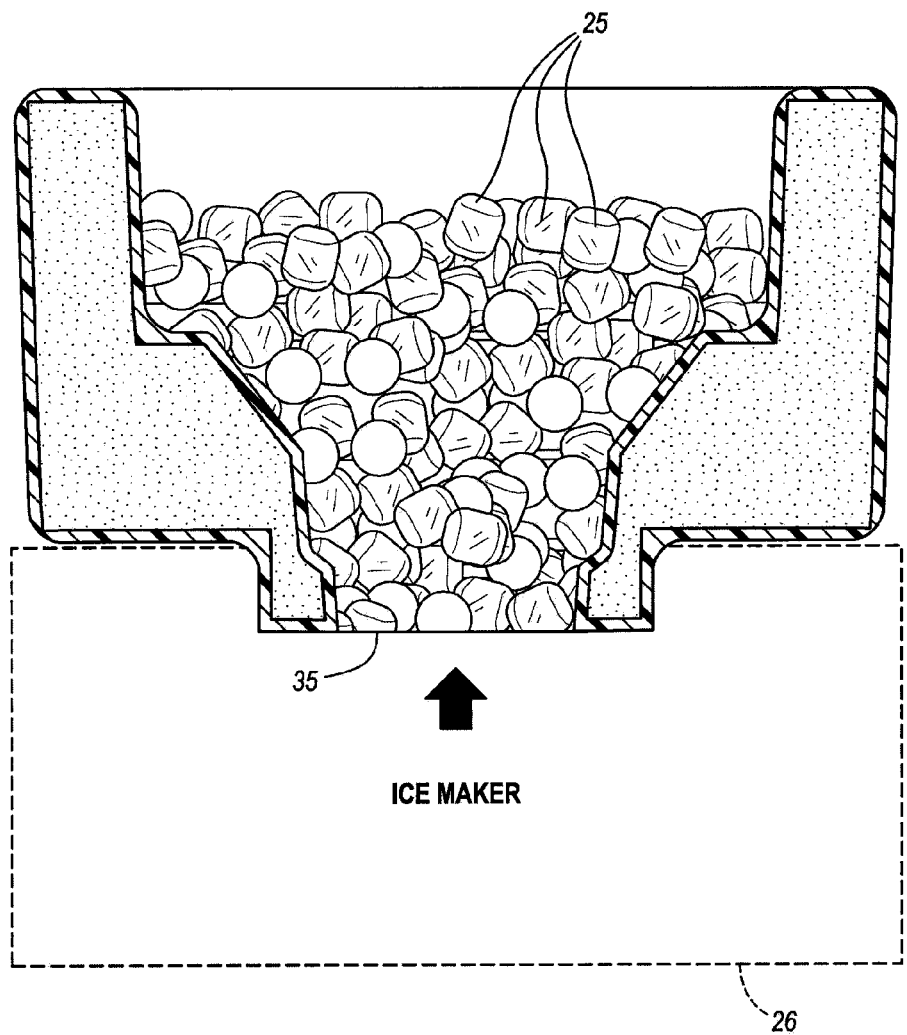
FIG. 10 is a cross-sectional view of a portion of the hopper of FIG. 8 taken along cross-section indicators 10-10.
Figure 11:
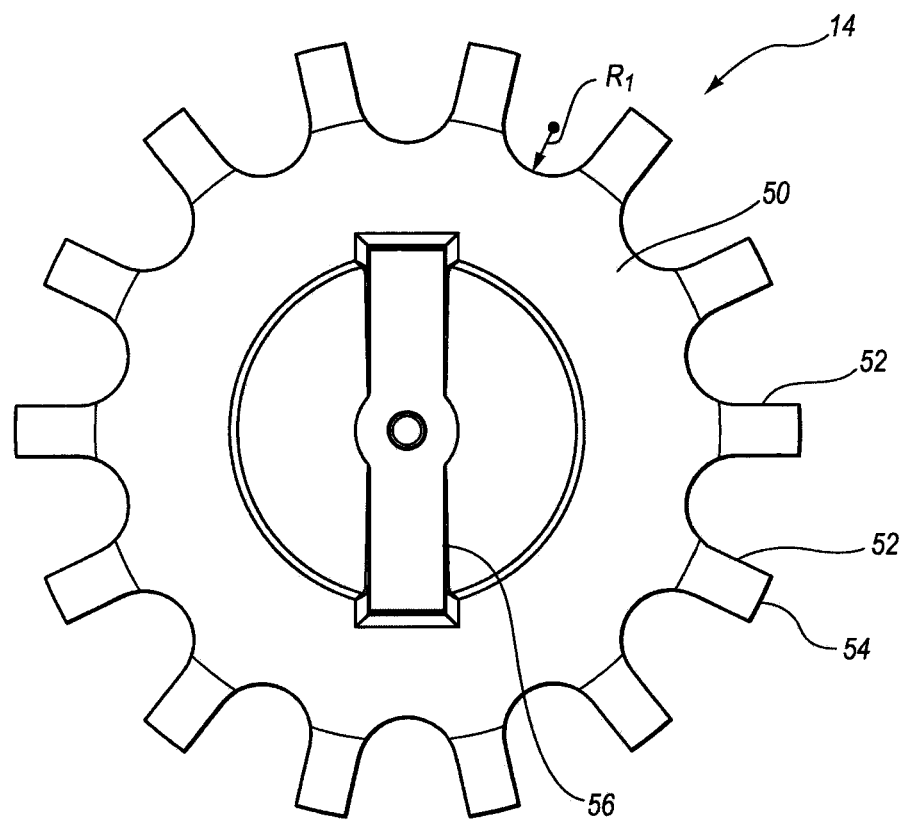
FIG. 11 is a top view of a metering member of the ice dispensing system of FIG. 1.

A maximum width $X_2$ is defined by the dividing wall 74 at the minimum radius $R_3$. The width $X_2$ is usually at least great enough to substantially cover the cavities 52 as the cavities 52 rotate to a position in which the dividing wall 74 overlaps the cavities 52. When the cavities 52 are positioned overlapping and covered by the dividing wall 74, the cavities 52 are in a dispense region 29 (see FIG. 4), wherein ice within the cavities 52 is dispensed through the ice outlet opening 36 of the hopper 12. When the cavities 52 are positioned at other locations removed from being overlapped and covered by the dividing wall 74, the cavities 52 are in the fill region 28 within the hopper 12. FIG. 4 illustrates various cavities 52 positioned in the fill region 28 and the dispense region 29.

The dividing wall 74 may be positioned adjacent to the top surface 50 of the metering member 14. In this arrangement, the dividing wall 74 scrapes off any excess ice that is piled on top of a given cavity 52 as the cavity 52 passes from the fill region 28 into the dispense region 29.

The dividing wall 74 shields or covers the cavities 52 while the cavities are being emptied so that no additional ice fills the cavities 52 while the cavities 52 are being emptied. When the cavities 52 are rotated to a position away from the dividing wall 74 and in the fill region 28, the cavities 52 may be again filled with ice.

The shelf surface 72 and dividing wall 74 may be integrally formed as a single piece as part of the shelf member 18. In other arrangements, the shelf surface 72 and dividing wall 74 may be constructed as separate pieces that are assembled together in a secondary assembly step. The shelf member 18 may be removably mounted within the hopper 12. In some arrangements, at least portions of the shelf member 18 may be permanently mounted within the hopper 12.

The breakup protrusions 76 extend from the shelf surface 72. The breakup protrusions 76 may have any shape and size, and may be positioned at any given orientation along the shelf surface 72 or any other surface of the shelf member 18. Typically, at least one breakup protrusion 76 is included on the shelf member 18. In some arrangements, three or more breakup protrusions 76 are provided. The breakup protrusions 76 may provide at least minimal breakup of ice within the hopper 12, in particular ice in contact with the shelf surface 72.

Figure 20:
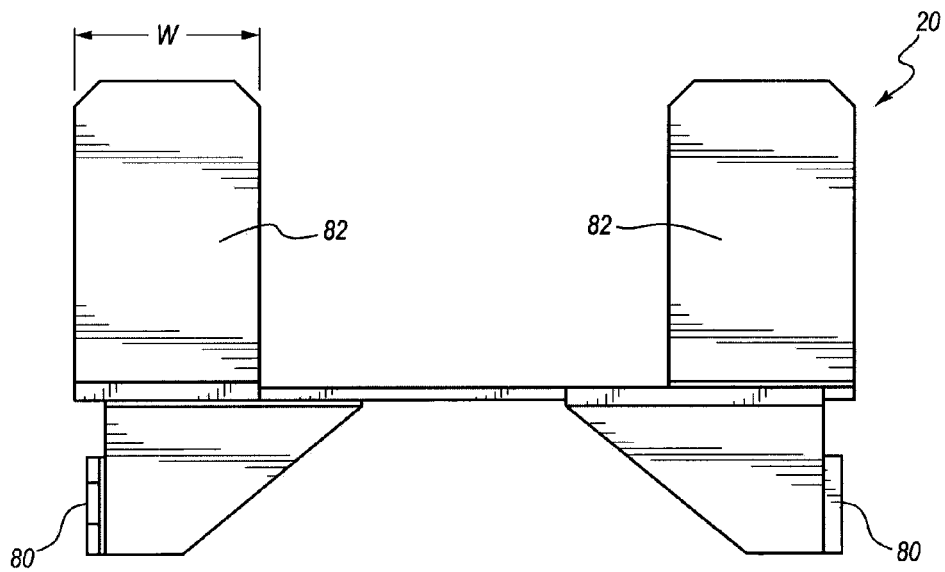
FIG. 20 is a side view of an agitator of the ice dispensing system of FIG. 1.
Figure 21:
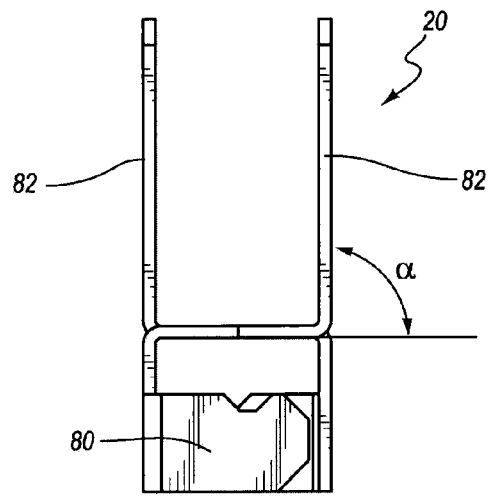
FIG. 21 is an end view of the agitator of FIG. 20.
Figure 22:
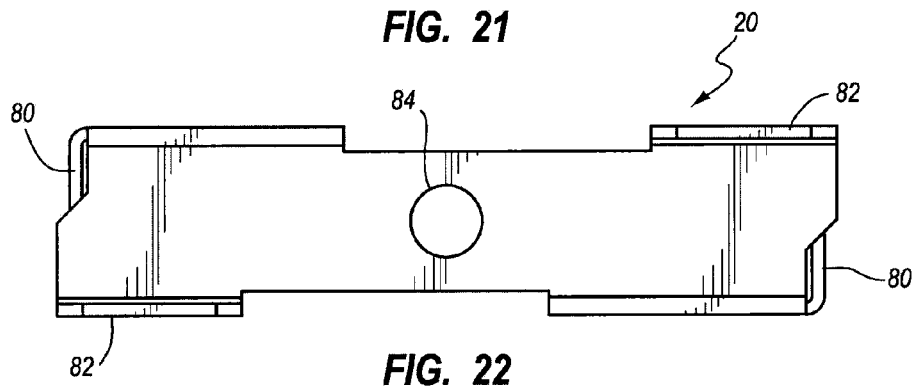
FIG. 22 is a top view of the agitator of FIG. 20.
Figure 23:
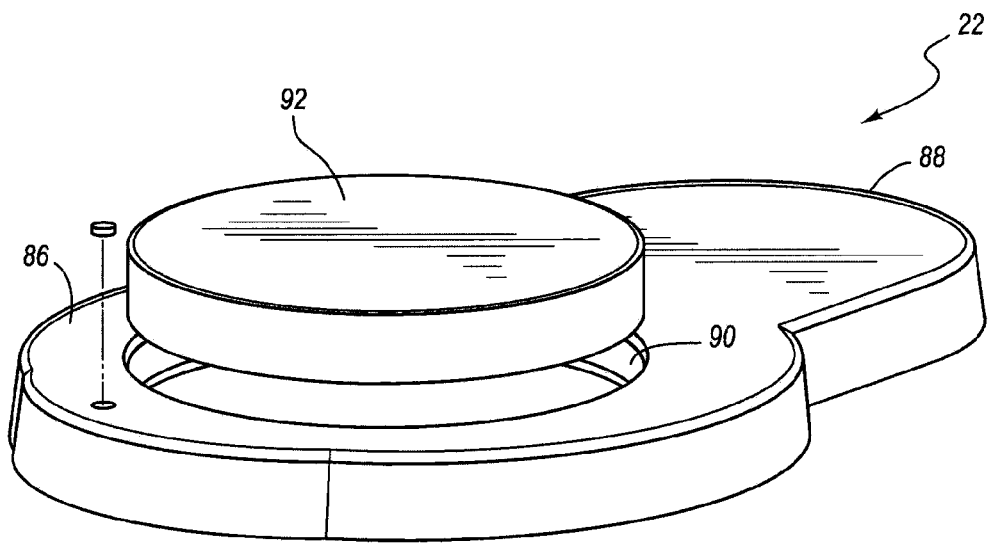
FIG. 23 is an exploded perspective view of a lid assembly of the ice dispensing system of FIG. 1.
Figure 24:
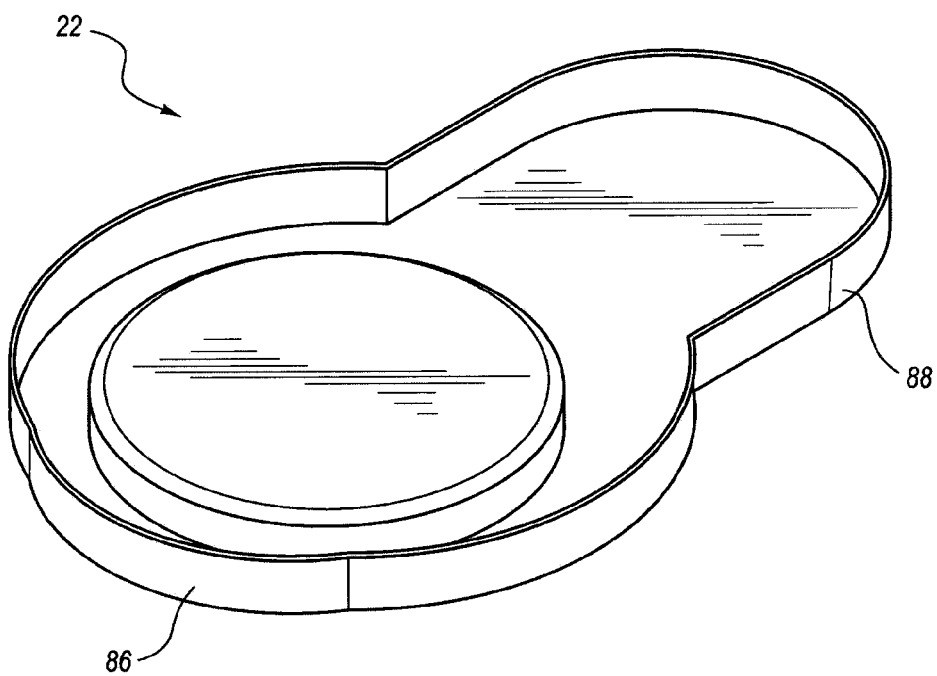
FIG. 24 is a bottom view of the lid assembly of FIG. 23.
Figure 25:
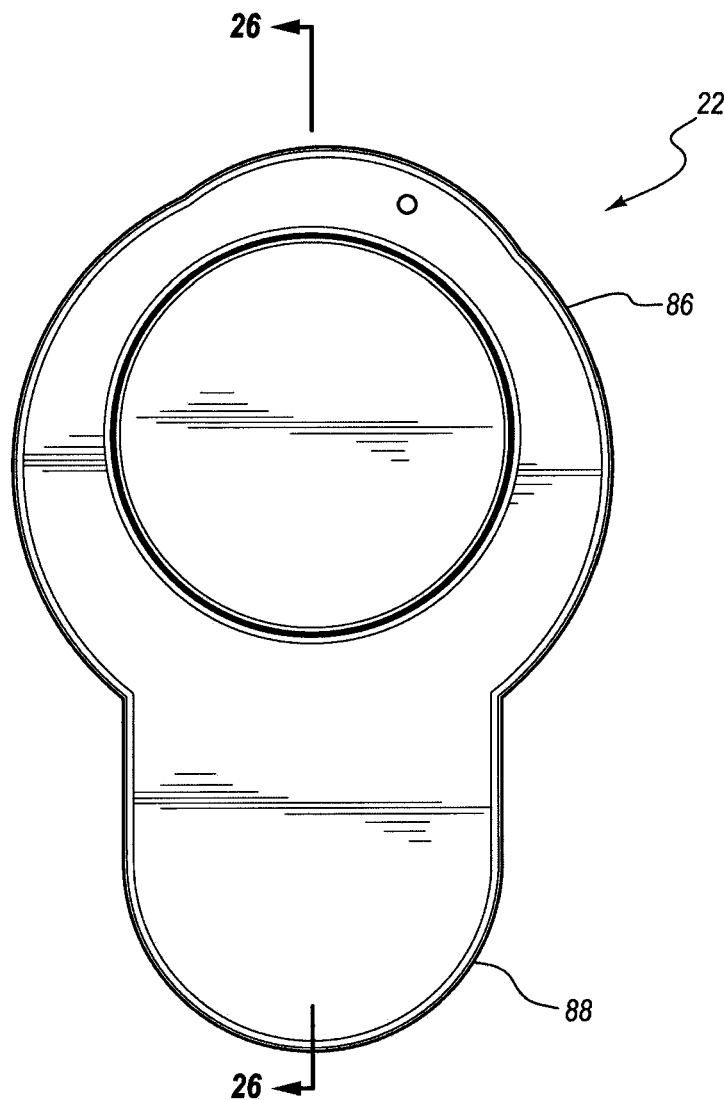
FIG. 25 is a bottom view of the lid assembly of FIG. 23.
Figure 26:
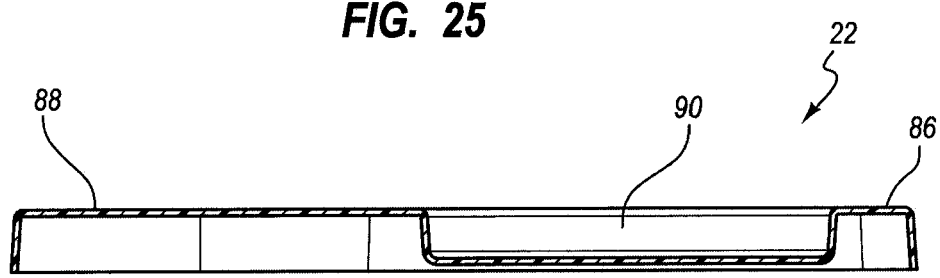
FIG. 26 is a cross-sectional view of the lid assembly of FIG. 25 taken along cross-section indicators 26-26.

Referring now to FIGS. 20-22, the agitator 20 includes a pair of locking tabs 80, a pair of agitator members 82, and an alignment aperture 84. The locking tabs 80 may releasably contact the connector recesses 58 (see FIG. 11) of the metering member 14 to assist in releasably mounting the agitator 20 to the metering member 14. In other arrangements, the agitator 20 may be directly connected to a portion of the motor assembly 16 such as, for example, the coupler 66.

The agitator members 82 may extend at an angle $\alpha$ within the interior 41 of the hopper 12. In some examples, the angle $\alpha$ is in the range of about 45 degrees to about 135 degrees, and more preferably in the range of about 80 degrees to about 100 degrees. The agitator members 82 may have a width W in the range of about, for example, 0.5 inches to about 1.5 inches, and more preferably about 0.7 inches to about 1.3 inches. While two agitator members 82 are shown, other arrangements are possible in which a single agitator member or three or more agitator members are included. In some arrangements, multiple agitators 20 may be positioned in a single hopper 12. The agitator members 82 may extend at different angles $\alpha$ relative to a longitudinal axis of the hopper 12.

Figure 12:
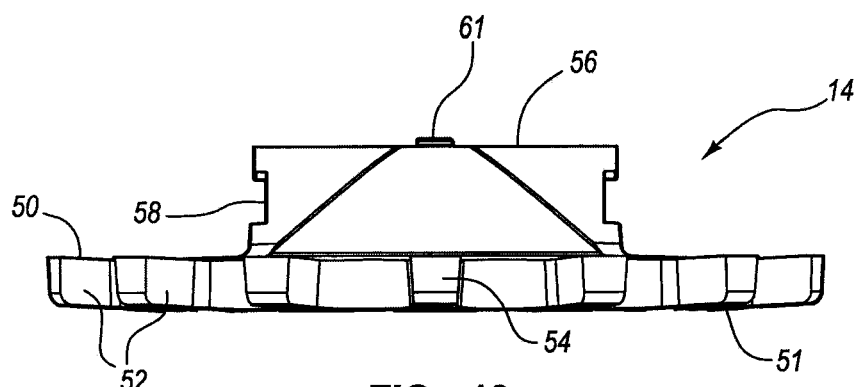
FIG. 12 is a side view of the metering member of FIG. 11.
Figure 14:
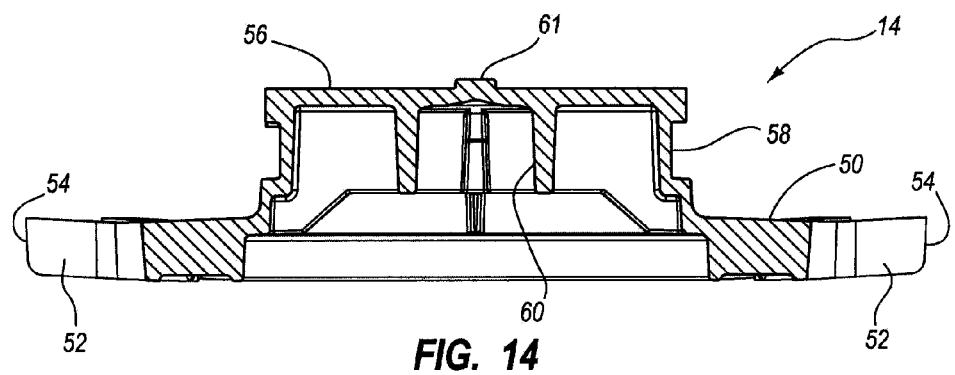
FIG. 14 is a cross-sectional view of the metering member of FIG. 13 taken along cross-section indicators 14.14.
Figure 13:
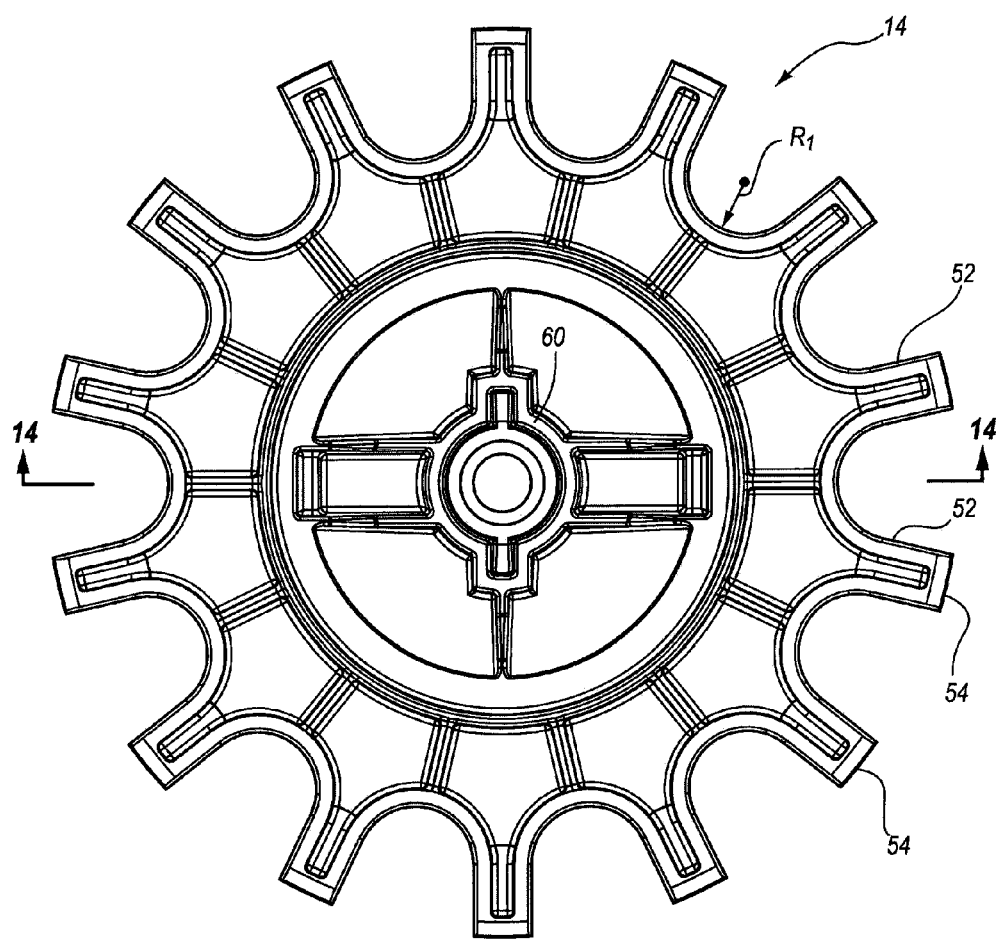
FIG. 13 is a bottom view of the metering member of FIG. 11.

The alignment aperture 84 is sized to contact an alignment feature of the metering member 14 such as, for example, an alignment protrusion 61 (see FIG. 12). The alignment aperture 84 and alignment protrusion 61 may be coaxially aligned with a longitudinal axis of the hopper 12.

Typically, the agitator members 82 extend vertically within the interior 41 of the hopper 12 to a position adjacent to the shelf surface 72 of the shelf member 18 (see FIG. 4). In other arrangements, the agitator members 82 may extend at any desired height within the hopper 12 and position relative to the shelf member 18. In at least some arrangements, it may be beneficial to position at least a portion of the agitator members 82 at a location vertically below the shelf surface 72 to assist in breaking up ice as the ice passes between the agitator 20 and the shelf surface 72 and fills the cavities 52 in the fill region 28.

Referring now to FIGS. 23-26, the lid assembly 22 may include first and second portions 86, 88, a recess 90, and an insulator 92 positioned in the recess 90. The first portion 86 is sized to substantially cover the open top end 30 of the hopper 12. The second portion 88 is sized to substantially cover the ice inlet opening 34 and ice input 35 (see FIG. 7). In at least some arrangements, the lid assembly 22 is configured to releasably mount to the hopper 12 using, for example, a snap-fit connection. In other arrangements, a bracket, latch, or other fastening device may be used to releasably secure the lid assembly 22 to the hopper 12 to limit inadvertent removal of the lid assembly 22.

The insulator 92 may assist in maintaining a lower temperature within the interior 41 of the hopper 12. The insulator 92 may be removable. In some arrangements, the insulator 92 may be permanently mounted within the recess 90. In other arrangements, other portions of the lid assembly 22 may be filled with an insulating material.

Referring again to FIG. 5, the hopper 12 may further include an emitter assembly 24. The emitter assembly 24 may include a lens 94, an LED emitter 96 and an LED holder 98. The hopper 12 may further include a receiver assemble 23. The receiver assembly 23 may include a lens 94, an LED receiver 95 and an LED holder 98. The emitter assembly 24 and receiver assembly 23 may be positioned relative to the hopper 12 to determine a fill level of ice within the interior 41. The emitter assembly 24 and receiver assembly 23 may include a position sensor of any desired type such as, for example, an infrared or ultrasonic type position sensor.

Other types of sensors may be used in connection with the ice dispensing system 10. For example, sensors may be used to determine rotational speed or rotated position of the metering member 14. Other sensors may be used to determine characteristics of the agitator 20 (e.g., rotation speed), an amount of liquid within the interior 41 of the hopper 12, or dispensing of a substance (e.g., water or ice) from the ice dispensing system 10.

Figure 2:
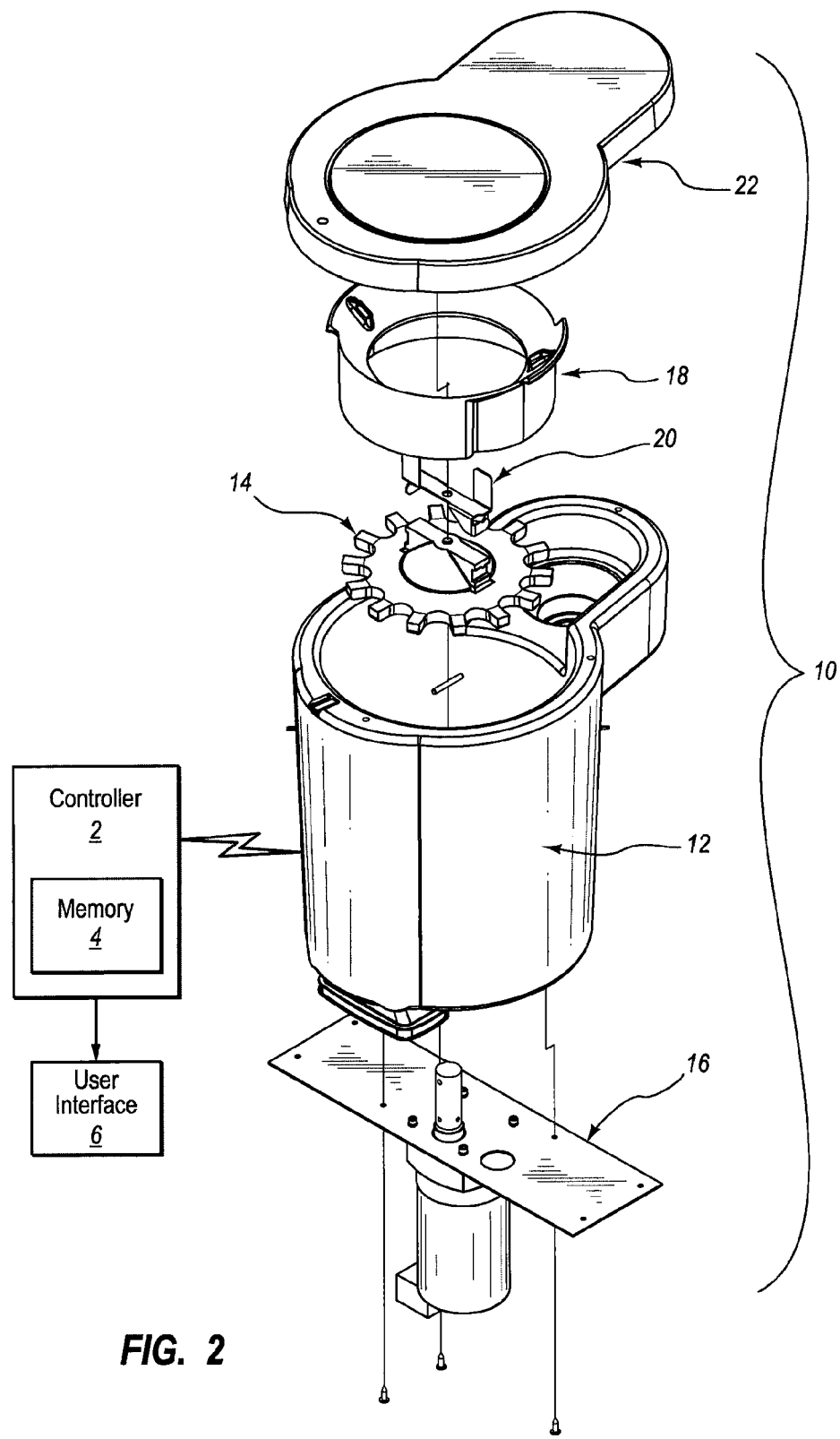
FIG. 2 is an exploded perspective view of the ice dispensing system of FIG. 1.
Figure 3:
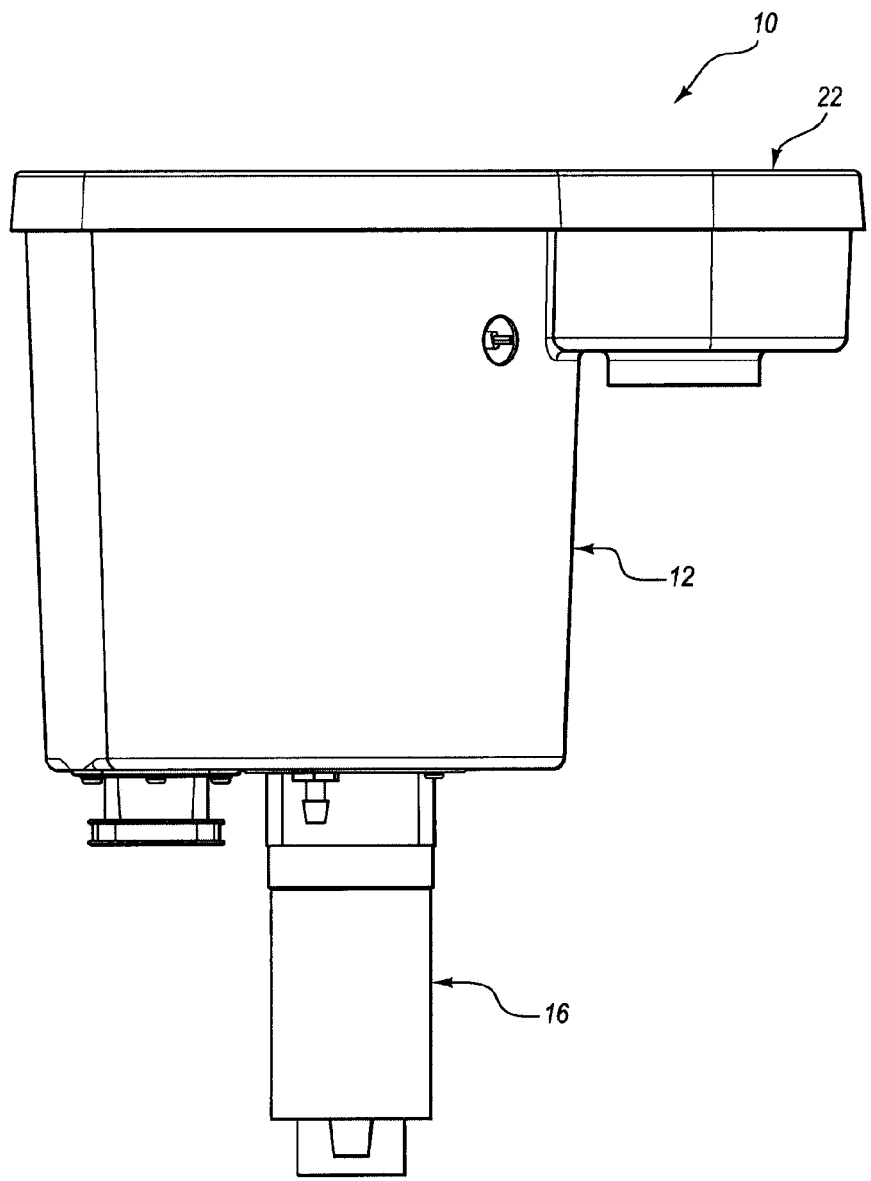
FIG. 3 is a side view of the ice dispensing system of FIG. 1.

The ice dispensing system 10 may further include a controller 2, memory 4, and a user interface 6 (see FIG. 2). The controller 2 may be operated via the user interface 6. The controller 2 may be configured to generate and receive a plurality of signals related to operation of various features of the ice dispensing system 10 such as, for example, filling of the hopper 12 with ice via the ice generating device 26, rotation of the metering member 14, and determination of an ice level within the hopper 12.

While this invention has been described with reference to certain specific embodiments and examples, it will be recognized by those skilled in the art that many variations are possible without departing from the scope and spirit of this invention. The invention, as described by the claims, is intended to cover all changes and modifications of the invention which do not depart from the spirit of the invention. The words "including" and "having," as used in the specification, including the claims, shall have the same meaning as the word "comprising."

We claim:

1. An ice dispensing system, comprising:
   a hopper configured to retain a supply of ice, the hopper having a bottom end with an outlet opening;
   a motor positioned vertically below the hopper;
   a shelf member positioned in the hopper dividing a portion of the supply of ice from a supply of ice under the shelf member;
   a metering member mounted within the hopper, the metering member including a plurality of ice cavities, the metering member being rotatable by the motor between a fill position wherein at least one of the ice cavities is exposed to and filled by the supply of ice under the shelf member, and a dispense position wherein the at least one cavity is aligned with the outlet opening to dispense ice from the at least one cavity;
   wherein the shelf member constantly shields at least a portion of each of the plurality of ice cavities.

2. The ice dispensing system of claim 1, wherein the metering member is oriented vertically below the supply of ice.

3. The ice dispensing system of claim 1, wherein the shelf includes at least one projection extending into the supply of ice.

4. The ice dispensing system of claim 1, wherein the metering member rotates relative to the shelf.

5. The ice dispensing system of claim 1, further comprising an agitator member mounted to the metering member, wherein rotation of the metering member rotates the agitator within the supply of ice to break apart the supply of ice and facilitates the delivery of the ice to the metering member in the fill position.

6. The ice dispensing system of claim 1, further comprising a dividing wall positioned in the hopper, wherein when the metering member is in the dispense position, the at least one ice cavity is shielded from the supply of ice by the dividing wall.

7. The ice dispensing system of claim 6, wherein the dividing wall is positioned under the shelf.

8. The ice dispensing system of claim 1, wherein the ice cavities are defined in part by the metering member and in part by a sidewall surface of the hopper, wherein rotation of the metering member relative to the hopper agitates the ice in the ice cavities.

9. An ice dispensing system, comprising:
   a cylindrical hopper having an outlet opening defined in a bottom end of the hopper and an ice inlet defined in a top end of the hopper;
   a metering disk positioned in the hopper, the metering disk including a plurality of cavities;
   a shelf member positioned in the hopper, the shelf member separating a supply of ice held in an upper portion of the hopper from a fill space underneath the shelf member, the shelf member arranged to constantly shield at least a portion of all of the cavities from the supply of ice held in the upper portion of the hopper;
   a dividing wall positioned in the hopper;
   wherein the metering disk is rotatable relative to the hopper between a first position wherein at least one cavity is exposed to the supply of ice in the fill space to be filled with ice and a second position wherein the at least one cavity is separated from the supply of ice by the dividing wall and the shelf member and ice in the at least one cavity is dispensed through the outlet opening.

10. The ice dispensing system of claim 9, further comprising an agitator positioned in the hopper and movable within the supply of ice to break apart the supply of ice.

11. The ice dispensing system of claim 9, wherein the plurality of cavities are evenly spaced apart around a circumference of the metering disk.

12. The ice dispensing system of claim 9, wherein the shelf member and dividing wall are integrally formed as a single piece.

13. The ice dispensing system of claim 9, wherein the shelf extends in a direction at least partially radially inward, and the dividing wall extends generally perpendicular to the shelf.

14. The ice dispensing system of claim 9, further comprising an ice generating device mounted to the hopper, the ice generating device configured to deliver the supply of ice into the hopper through the ice inlet.

15. The ice dispensing system of claim 14, wherein the ice generating device generates pellet or any other appropriate shaped ice.

16. The ice dispensing system of claim 9, further comprising a control system, the control system being operable to rotate the metering disk to dispense a selected volume of ice from the hopper depending on a size of the cavities, a duration of rotating the metering disk, and a speed of rotation of the metering disk.

17. The ice dispensing system of claim 9, wherein the dividing wall defines a nonconcentric interior shape in the hopper that increases ice break up and delivery of ice into the at least one cavity.

18. An ice dispensing system, comprising:
- a hopper having a sidewall surface, a bottom surface, and an outlet opening formed in the bottom surface at a bottom end thereof, the hopper being configured to hold ice;
- a metering member mounted within the hopper;
- at least one ice cavity defined in part by the metering member and in part by the sidewall surface of the hopper;
- wherein the metering member is rotatable to a fill position wherein the at least one ice cavity is filled by a first portion of ice held in the hopper, the ice cavity in the fill position being separated from the outlet opening, and the metering member is rotatable to a dispense position wherein the at least one ice cavity is exposed to the outlet opening to dispense ice from the at least one ice cavity; and
- a shelf member shielding the first portion of ice entering the at least one ice cavity from a second portion of ice resting on the shelf member directly above the first portion of ice, the shelf member constantly shielding at least a portion of one ice cavity from the second portion of ice.

19. The ice dispensing system of claim 18, further comprising a dividing wall arranged to shield the at least one ice cavity from the supply of ice when the metering member is in the dispense position.

20. The ice dispensing system of claim 19, wherein the dividing wall is between the shelf member and the outlet opening.

21. The ice dispensing system of claim 18, wherein the at least one ice cavity includes a plurality of ice cavities, and a separate one of the plurality of ice cavities is exposed to and filled by the supply of ice concurrently with the metering member being in the dispense position.

22. The ice dispensing system of claim 21, wherein a separate one of the plurality of ice cavities is aligned with the outlet opening to dispense ice concurrently with the metering member being in the fill position.

* * * * *